(12) United States Patent
Ryu et al.

(10) Patent No.: US 8,575,239 B2
(45) Date of Patent: Nov. 5, 2013

(54) CURING COMPOSITION AND CURED PRODUCT PREPARED BY USING THE SAME

(75) Inventors: Sang-Uk Ryu, Daejeon (KR); Dong-Ryul Kim, Daejeon (KR); Gi-Cheul Kim, Daejeon (KR); Ho-Jun Lee, Daejeon (KR); Jang-Yeon Hwang, Seoul (KR); Seung-Lac Ma, Chungju-si (KR)

(73) Assignee: LG Chem, Ltd., Seoul (KR)

( * ) Notice: Subject to any disclaimer, the term of this patent is extended or adjusted under 35 U.S.C. 154(b) by 433 days.

(21) Appl. No.: 12/810,678

(22) PCT Filed: Dec. 24, 2008

(86) PCT No.: PCT/KR2008/007667
§ 371 (c)(1),
(2), (4) Date: Dec. 24, 2008

(87) PCT Pub. No.: WO2009/084861
PCT Pub. Date: Jul. 9, 2009

(65) Prior Publication Data
US 2010/0286302 A1 Nov. 11, 2010

(30) Foreign Application Priority Data
Dec. 28, 2007 (KR) .................. 10-2007-0140368

(51) Int. Cl.
*C08L 67/00* (2006.01)
*C08L 63/00* (2006.01)

(52) U.S. Cl.
USPC ............ 523/466; 525/437; 525/438; 523/468

(58) Field of Classification Search
None
See application file for complete search history.

(56) References Cited

U.S. PATENT DOCUMENTS

| | | | | |
|---|---|---|---|---|
| 3,553,244 A | * | 1/1971 | Rolf et al. ...................... | 560/301 |
| 4,996,267 A | * | 2/1991 | Gerth et al. ................... | 525/423 |
| 5,258,483 A | * | 11/1993 | Yoshida et al. ................. | 528/87 |
| 2002/0105093 A1 | * | 8/2002 | Papathomas .................. | 257/778 |
| 2005/0065241 A1 | * | 3/2005 | Ishii et al. ..................... | 523/400 |
| 2005/0159542 A1 | * | 7/2005 | Acar et al. ...................... | 525/40 |
| 2006/0093826 A1 | * | 5/2006 | Koeniger et al. ........... | 428/411.1 |
| 2007/0059456 A1 | * | 3/2007 | Lee et al. ........................ | 428/1.3 |
| 2007/0060737 A1 | * | 3/2007 | Lee et al. ....................... | 528/176 |
| 2008/0200636 A1 | * | 8/2008 | Nakanishi et al. ............ | 528/105 |

FOREIGN PATENT DOCUMENTS

| EP | 0532893 A2 | * | 8/1992 |
|---|---|---|---|
| EP | 0532893 A2 | * | 3/1993 |
| WO | WO 03/87230 | | 10/2003 |

* cited by examiner

*Primary Examiner* — David Buttner
*Assistant Examiner* — Ha Nguyen
(74) *Attorney, Agent, or Firm* — McKenna, Long & Aldridge, LLP

(57) ABSTRACT

The present invention relates to a curing composition comprising a polyarylate having epoxy group and a cyanate ester resin, and a cured product prepared by using the same. The curing composition according to the present invention is used to provide a cured product which is excellent in terms of heat resistance and toughness.

16 Claims, No Drawings

CURING COMPOSITION AND CURED PRODUCT PREPARED BY USING THE SAME

This application is a 35 U.S.C. §371 National Stage entry of International Application No. PCT/KR2008/007667, filed on Dec. 24, 2008, and claims priority to Korean Application No. 10-2007-0140368, filed on Dec. 28, 2007, which are all hereby incorporated by reference in their entireties.

TECHNICAL FIELD

The present invention relates to a curing composition and a cured product prepared by using the same, in which the curing composition can improve heat resistance, toughness, and cure degree of the cured product.

This application claims priority from Korean Patent Application No. 10-2007-0140368 filed on Dec. 28, 2007 in the Korean Intellectual Property Office, the disclosure of which is incorporated herein by reference in its entirety.

BACKGROUND ART

Japanese Patent Application No. 2001-011295 describes a thermosetting resin composition containing an epoxy resin and liquid crystal polyester.

In addition, Japanese Patent Application No. 1999-302529 describes a curable resin composition containing a polyphenylene ether resin, an epoxy resin, and a cyanate ester resin.

However, the resin compositions described in the above patent publications do not provide sufficient heat resistance, toughness and cure degree.

DISCLOSURE

Technical Problem

The present inventors found that excellent heat resistance, toughness and cure degree can be achieved upon using a polyarylate having epoxy group and a cyanate ester resin as ingredients of curing composition. Accordingly, the present invention provides a curing composition capable of providing excellent heat resistance, toughness, and cure degree, and a cured product prepared by using the same.

Technical Solution

In order to achieve the above object, the present invention provides a curing composition comprising a polyarylate having epoxy group and a cyanate ester resin Further, the present invention provides a curing method for curing the curing composition.

Further, the present invention provides a cured product prepared by using the curing composition.

Advantageous Effects

The curing composition according to the present invention includes a polyarylate having epoxy group and a cyanate ester resin, thereby providing excellent heat resistance and toughness, and controlling cure degree.

BEST MODE

Hereinafter, the present invention will be described in detail.

The curing composition according to the present invention is characterized in that it includes a polyarylate having epoxy group and a cyanate ester resin, so as to provide excellent heat resistance, toughness, and cure degree.

A cyanurate structure that is formed by curing the cyanate ester group of the cyanate ester resin is reacted with the epoxy group in the polyarylate, so that an isocyanurate structure is formed. A thermoplastic resin is incorporated into the network structure of thermosetting resin, leading to graft formation. Thus, a fine phase separation of the thermoplastic resin does not occur, so as to improve heat resistance, toughness, and cure degree.

Further, in the curing composition according to the present invention, heat resistance and cure degree can be controlled by controlling the concentration of epoxy group in the polyarylate and the cyanate ester resin.

In the present invention, the polyarylate having epoxy group is not particularly limited to its structure, but include a repeating unit that is represented by the following Formula 1:

[Formula 1]

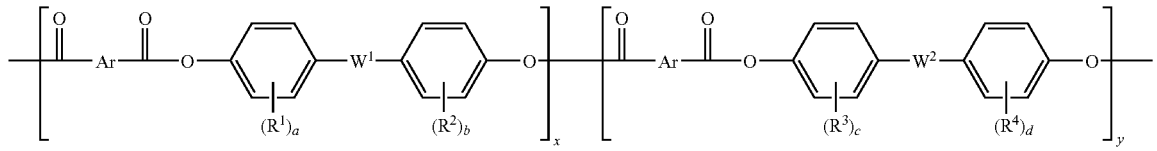

wherein x and y are a molar ratio satisfying x+y=1, x=0, and y>0, and y is preferably 0.1 to 1 (If the molar ratio of y is less than 0.1, it is difficult to obtain the curing effect. In addition, polymerization is performed by controlling the molar ratio of y within 0.1 and 1, so that the cure degree with the cyanate ester resin can be controlled), a and b are an integer of 1 to 4, and c and d are an integer of 1 to 3, $R^1$ and $R^2$ are the same as or different from each other, each independently selected from the group consisting of hydrogen atom, halogen atom, alkyl, arylalkyl, alkenyl, arylalkenyl, aryl, alkylaryl, alkenylaryl, nitrile and alkoxy, at least one of $R^3$ and $R^4$ is a group having epoxy group, and the other is selected from the group consisting of alkyl having 2 to 10 carbon atoms, cycloalkyl having 3~12 carbon atoms, and alkylaryl having 7 to 20 carbon atoms, $W^1$ and $W^2$ are each independently selected from the group consisting of direct bond, oxygen, sulfur, alkylene, cycloalkylene, fluorene, sulfonyl, sulfinyl, and carbonyl, and Ar is selected from the group consisting of phenylene, naphthylene and biphenylene.

In Formula 1, the alkylene is preferably straight or branched chain alkylene having 1 to 12 carbon atoms, and the cycloalkylene is preferably cycloalkylene having 3 to 20 carbon atoms. The arylene is preferably arylene having 6 to 20 carbon atoms, for example, phenylene, naphthylene, biphenylene or the like.

Further, the alkyl is preferably straight or branched chain alkyl having 1 to 12 carbon atoms, and the alkenyl is preferably straight or branched chain alkenyl having 2 to 12 carbon atoms, for example, allyl and vinyl. The aryl is preferably aryl having 6 to 20 carbon atoms, and the alkylaryl is preferably alkylaryl having 7 to 20 carbon atoms.

Further, the group having epoxy group means an alkyl group having epoxy group and 2 to 12 carbon atoms.

Preferably, the polyarylate having epoxy group includes a repeating unit that is represented by the following Formula 2:

[Formula 2]

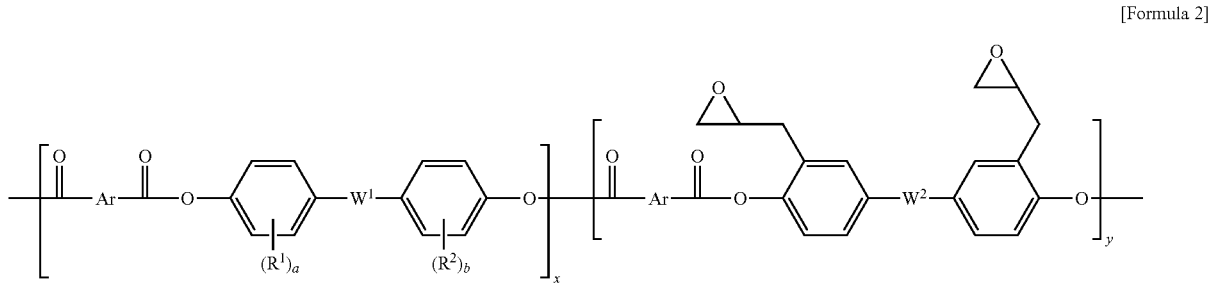

wherein $R^1$, $R^2$, a, b, $W^1$, $W^2$, Ar, x and y are the same as defined in Formula 1.

The polyarylate having epoxy group may be polymerized by interfacial polymerization, melt polymerization, or solution polymerization, and preferably interfacial polymerization in terms of reaction rate and separation/purification of polymers after polymerization.

Accordingly, the polyarylate having epoxy group may be prepared by copolymerizing bivalent phenol, bivalent aromatic carboxylic acid or halide thereof, and bisphenol derivative having double bond by interfacial polymerization. For example, it is prepared by the following Reaction Scheme 1, and the double bond may be converted into epoxide group using an epoxidizing agent, but is not limited thereto.

hydroxycarbonylphenyl)propane, 4,4'-oxo-bis(benzoic acid), bis(4-hydroxycarbonylphenyl)sulfide, bis(4-hydroxycarbonylphenyl)sulfone, and aromatic dicarboxylic acid derivatives where the aromatic group is substituted with $C_1$-$C_2$ alkyl or halogen group, but are not limited thereto. In particular, among the carboxylic acid halides, a mixture of terephthalic acid halide of 10 to 90 mol % and isophthalic acid halide of 90 to 10 mol % is preferable.

Examples of the bisphenol derivative to be used for the preparation of the polyarylate having epoxy group include bisphenol A(4,4'-isopropylidenediphenol), bisphenol S(4,4'-sulfonyldiphenol), bisphenol E(bis(4-hydroxyphenyl)methane), bisphenol F(4,4'-ethylidenediphenol), bisphenol C(bis (4-hydroxyphenyl-2,2-dichloroethylene)), bisphenol M((1, 3-phenylenediisopropylidene)bisphenol), bisphenol Z(4,4'-cylcohexylidenebisphenol), bisphenol P((1,4-phenylenediisopropylidene)bisphenol), bisphenol AP(4,4'-(1-phenylethylidene)bisphenol), bisphenol AF(4,4'-(hexafluoroisopropylidene)diphenol), tetramethyl bisphenol A, and tetramethyl bisphenol S. The bisphenol having double bond may be prepared by thermal rearrangement, as reported by Thermochiica Acta (2000, 359, 61~67) or by modification

[Reaction Scheme 1]

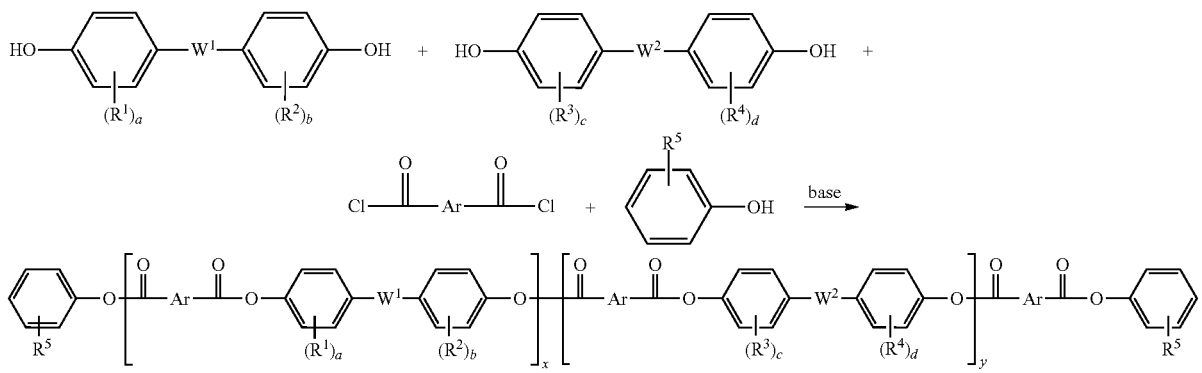

wherein $R^1$, $R^2$ and $R^5$ are the same as defined in $R^1$ and $R^2$ of Formula 1, and $R^3$, $R^4$ a, b, c, d, x, y, Ar, $W^1$ and $W^2$ are the same as defined in Formula 1.

Examples of divalent aromatic carboxylic acid or halide thereof to be used for the preparation of the polyarylate having epoxy group include one or mixtures thereof selected from terephthalic acid, isophthalic acid, dibenzoic acid, naphthalenedicarboxylic acid, 4,4'-methylene-bis(benzoic acid), 1,2-bis(4-hydroxycarbonylphenyl)ethane, 2,2-bis(4- of bisphenol having allyl group into bisphenol having methylvinyl group under basic conditions as in U.S. Pat. No. 4,288,583.

Additionally, upon preparation of the polyarylate having epoxy group, a molecular weight modifier may be used to modify the molecular weight of the polymer. Preferred examples of the molecular weight modifier include a monovalent hydroxy compound, for example, a monovalent phenol compound such as phenol, o-, m-, p-cresol, o-, m-, p-ethyl phenol, o-, m-, p-propyl phenol and o-, m-, p-tert-butyl phenol, o-, m-, p-allylphenol; or a monohydric alcohol compound such as methanol, ethanol, n-propanol, isopropanol, n-butanol, pentanol, hexanol, dodecyl alcohol, stearyl alcohol, benzyl alcohol, phenetyl alcohol, allylalcohol; and a monovalent (aromatic) carboxylic acid halide such as benzoyl chloride, acetic acid halide, propionic acid halide, octanoic acid halide, cyclohexylcarboxylic acid halide, toluic acid halide, p-tert-butylbenzoic acid halide, p-methoxyphenylacetic acid halide; and sulfonic acid chloride such as benzenesulfonic acid chloride, toluenesulfonic acid chloride, and methanesulfonic acid chloride.

Further, upon the preparation of the polyarylate having epoxy group, a base may be used. In this connection, examples of the base may include alkali metal hydroxide such as sodium hydroxide and potassium hydroxide. It is preferable that the amount of base is 1.01 to 2.5 times as much as the mole number of the phenolic hydroxyl group contained in divalent phenol and monovalent phenol compounds. If the amount is less than 1.01 times, it is impossible to completely dissolve the divalent phenol compound. If the amount is more than 2.5 times, an excessive amount of acid is needed for neutralization. Additionally, in consideration of hydrolysis of aromatic dicarboxylic acid halide that occurs during the polymerization process, the amount of base is preferably set to be 1.01 to 2.5 times as much as the mole number of the phenolic hydroxyl group in the preparation of polyarylate having epoxy group.

Examples of the epoxidizing agent include peroxy acid such as m-chloroperoxybenzoic acid, peroxybenzoic acid, formyl peroxyacid, and acetic peroxyacid; and peroxide such as hydrogen peroxide, and t-butylperoxide, but are not limited thereto. Peroxy acid is preferable in terms of convenience and reaction rate, and preferably used in an amount of 0.9~2.0 equivalent weights per the double group. If the amount is less than 0.9 equivalent weight, the conversion rate of epoxy group capable of reacting with cyanate ester is low. If the amount is more than 2.0 equivalent weights, it is difficult to remove unreacted epoxidizing agent.

Further, an organic solvent in interfacial polymerization to be used for the preparation of polyarylate having epoxy group may be a solvent that is able to dissolve polyarylate, but not miscible with water. Examples thereof may include one or more selected from the group consisting of halogenated solvents such as methylene chloride, 1,2-dichloroethane, chloroform, carbon tetrachloride, chlorobenzene, 1,1,2,2-tetrachloroethane and aromatic solvents such as toluene, xylene, and benzene.

To improve the rate of interfacial polymerization, a phase transfer catalyst may be used, and typically exemplified by tetraalkylammonium ion, tetraalkylphosphonium ion, or nonionic surfactant.

Upon the polymerization of polyarylate having epoxy group, the polymerization temperature is 0 to 40° C., preferably 0 to 30° C., in terms of inhibiting hydrolysis of carboxylic acid or halide thereof and hydrolysis of polymer. After completing the polymerization according to the above method, an excessive amount of base is neutralized with acid, and the stirring is stopped. Then, the aqueous layer is discarded, and the organic layer is repeatedly washed with deionized water to remove salts, resulting in a polyarylate resin having epoxy group.

The polyarylate having epoxy group preferably has a weight average molecular weight of 5,000 to 100,000.

In the present invention, the cyanate ester resin includes a compound that is represented by the following Formula 3 or oligomer thereof:

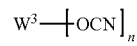

[Formula 3]

wherein n is an integer of 2 or more, and
$W^3$ is selected from the group consisting of alkyl, alkylaryl, alkyldiaryl, cycloalkyl, cycloalkyldiaryl, aryl, fluorene, fluorenediaryl, oxydiaryl, sulfonyldiaryl, sulfinyldiaryl, and carbonyldiaryl, which have one or more functional groups selected from the group consisting of hydrogen, halogen, nitrile and alkoxy.

The $W^3$ is preferably selected from alkyl, phenyl, alkyldiphenyl, cycloalkyldiphenyl, fluorenediphenyl, oxydiphenyl, biphenyl, sulfonyldiphenyl, sulfinyldiphenyl and carbonyldiphenyl.

In Formula 3, the alkyl is preferably straight or branched chain alkyl having 1 to 12 carbon atoms, the cycloalkyl is preferably cycloalkyl having 3 to 20 carbon atoms, the aryl is preferably aryl having 6 to 20 carbon atoms, and the alkylaryl is preferably alkylaryl having 7 to 20 carbon atoms. In addition, the alkyldiaryl is preferably alkyldiaryl having 13 to 40 carbon atoms, and may have a structure of -aryl-alkyl-aryl-, for example, bismaleimide diphenylmethane. The cycloalkyldiaryl is preferably cycloalkyldiaryl having 15 to 40 carbon atoms, and may have a structure of -aryl-cycloalkyl-aryl-. The fluorenediaryl may have a structure of -aryl-fluorene-aryl-, and the oxydiaryl may have a structure of -aryl-oxygen-aryl-.

In the present invention, examples of the compound having cyanate ester group include 2,2-bis(4-cyanatophenyl)propane, bis(4-cyanatophenyl)methane, bis(3-methyl-4-cyanatophenyl)methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, di(4-cyanatophenyl)ether, di(4-cyanatophenyl)thioether, di(4-cyanato-2-tertiarybutyl-3-methylphenyl)thioether, 4,4-dicyanatobiphenyl, 1,3-bis(4-cyanatophenyl-1-(1-methylethylidene))benzene, 1,4-bis(4-cyanatophenyl-1-(1-methylethylidene))benzene, 4,4'-bis(trifluoromethyl) methylenediphenyl cyanate, and prepolymers derived therefrom, but are not limited thereto. Examples of the prepolymer include BA230S®(oligomer of 2,2-bis(4-cyanatephenyl)propane, Lonza).

In the curing composition according to the present invention, the cyanate ester resin is preferably contained in an amount of 10 to 400 parts by weight, based on 100 parts by weight of the polyarylate having epoxy group. If the content is less than 10 parts by weight, binding of epoxy group with the cyanate group is induced, which is not suitable to increase a glass transition temperature (Tg). Even if the content is more than 400 parts by weight, there is no effect of increasing the glass transition temperature (Tg).

The curing composition according to the present invention may further include a curing agent or curing catalyst. The curing catalyst is, but not specifically limited to, preferably a transition metal catalyst, phenol, or phenol having substituents. In addition, the end-uncapped polyarylate may used.

Examples of the transition metal catalyst include organic materials including one or more selected from the group consisting of divalent cobalt ion, divalent zinc ion, divalent manganese ion, and trivalent manganese ion. Examples thereof include acetic acid cobalt, acetylacetic acid cobalt, 2-ethylhexanoic acid cobalt, hexafluoro acetylacetic acid cobalt, oxalic acid cobalt, naphthalic acid cobalt, acetic acid zinc, citric acid zinc, 4-cyclohexylbutanoic acid zinc, naphthalic acid zinc, acetylacetic acid manganese(II), acetylacetic acid manganese(III), naphthalic acid manganese, and they may be used alone or in a mixture of two or more.

In addition, the phenol or phenol having substituents is preferably those substituted with one hydroxy group or alkyl having 1 to 10 carbon atoms, aryl, substituted aryl group, halogen or hydrogen in a benzene ring. Examples thereof include tetramethylphenol, 2,4,6-tribromo-3-methoxyphenol, 2,6-dibromo-4-t-butylphenol, 2-methylphenol, 3-methylphenol, 4-methylphenol, 2-ethylphenol, 3-ethylphenol, 4-ethylphenol, 2-propylphenol, 3-propylphenol, 4-propylphenol, 2-isopropylphenol, 3-isopropylphenol, 4-isopropylphenol, 2-t-butylphenol, 3-t-butylphenol, 4-t-butylphenol, 2-isobutylphenol, 3-isobutylphenol, and 4-isobutylphenol, and they may be used alone or in combination.

The curing agent or curing catalyst is preferably contained in an amount of 0.01 to 10 parts by weight, based on 100 parts by weight of the curing composition. If the content is less than 0.01 parts by weight, it is not suitable to increase the reaction rate. If the content is more than 10 parts by weight, it is difficult to control the curing reaction due to the excessively high reaction rate.

If necessary, the curing composition according to the present invention may further include a filler, a plasticizer, a release agent, a coloring agent, a coupling agent, and a solvent in order to provide the desired properties.

Examples of the release agent include synthetic wax, natural wax, esters, metallic salts of straight chain fatty acid, acid amides, and paraffins, and example of the coloring agent includes carbon black. Examples of the filler include organic fillers such as tetrafluoride ethylene polymer and inorganic fillers such as glass fiber, glass flake, carbon fiber, silica, metal oxide, diamond, graphite, and carbon.

The curing composition according to the present invention may be cured by using heat, light or microwave alone or in sequential or simultaneous combinations. For example, the thermosetting may be performed at 150° C. or higher.

The present invention provides a cured product which is prepared by molding and curing the curing composition. Since the cured product is excellent in terms of heat resistance and toughness, it can be widely applied to a variety of fields requiring such physical properties, including electric/electronic materials, air and space materials, various adhesives, casting materials, and molding materials.

Further, the present invention provides a composite, in which the curing composition is mixed with glass fiber or carbon fiver. The composite can be used in the field requiring improved toughness.

The curing composition according to the present invention is molded by molding methods known in the art, such as injection molding and compression molding methods, or molded and then cured under the above described curing conditions, thereby providing a cured product applicable to various fields.

MODE FOR INVENTION

Hereinafter, the present invention will be described in more detail with reference to Examples. However, these Examples are for illustrative purposes only, and the invention is not intended to be limited by these Examples.

Preparation Example 1

Polymerization of Polyarylate Having Epoxy Group

A mixture A of 450 g of distilled water, 19.0 g of sodium hydroxide, 45.2 g of bisphenol A, 7.0 g of diallyllbisphenol A, 1.5 g of 2-allylphenol, and 0.5 g of benzyltriethylammonium chloride was added to a reactor that is provided with an agitator, and the temperature of the reactor was maintained at 25° C. Separately, 45.0 g of aromatic dicarboxylic acid chloride mixture B in which the same amounts of isophthalic acid chloride and terephthalic acid chloride were mixed with each other was dissolved in 620 g of methylene chloride. The mixture solution B was added to the reactor in which the alkali aqueous solution A was dissolved while the solution was stirred. After the stirring was performed for 1 hour, a hydrochloric acid was added, and the washing was then performed with distilled water. The washing was repeated until the conductivity of the water layer was 20 μs/cm or less, the resulting solution was poured onto methanol to perform phase separation of polymers. The polymers were filtered, and the drying was performed in a vacuum oven at 60° C. for 12 hours to remove the solvent. (Mw 32 k, Mn 16 k, Tg 163° C.)

20 g of the above polyarylate was dissolved in 800 g of MC, and then 4.0 g of mCPBA (purity 70%) was added thereto. The mixture was left at room temperature for 24 hrs for epoxidation, and then precipitated with an excessive amount of ethanol. (Mw 32 k, Mn 16 k, Tg 173° C.)

Preparation Example 2

Polymerization of Polyarylate Having Epoxy Group

A mixture A of 420 g of distilled water, 17.6 g of sodium hydroxide, 25.3 g of bisphenol A, 25.8 g of diallyllbisphenol A, 3.9 g of 2-allylphenol, and 0.5 g of benzyltriethylammonium chloride was added to a reactor that is provided with an agitator, and the temperature of the reactor was maintained at 25° C. Separately, 41.6 g of aromatic dicarboxylic acid chloride mixture B in which the same amounts of isophthalic acid chloride and terephthalic acid chloride were mixed with each other was dissolved in 600 g of methylene chloride. The mixture solution B was added to the reactor in which the alkali aqueous solution A was dissolved while the solution was stirred. After the stirring was performed for 1 hour, a hydrochloric acid was added, and the washing was then performed with distilled water. The washing was repeated until the conductivity of the water layer was 20 μs/cm or less, the resulting solution was poured onto methanol to perform phase separation of polymers. The polymers were filtered, and the drying was performed in a vacuum oven at 60° C. for 12 hours to remove the solvent. (Mw 18 k, Mn 9 k, Tg 104° C.)

20 g of the dried solid was dissolved in 800 g of MC, and then 9.0 g of mCPBA (purity 70%) was added thereto. The mixture was left at room temperature for 24 hrs for epoxidation, and then precipitated with an excessive amount of ethanol. (Mw 18 k, Mn 9 k, Tg 133° C.)

Preparation Example 3

Polymerization of Polyarylate Having Epoxy Group

A mixture A of 450 g of distilled water, 18.86 g of sodium hydroxide, 35.7 g of bisphenol A, 10.4 g of diallyllbisphenol A, 0.9 g of 2-allylphenol, and 0.5 g of benzyltriethylammonium chloride was added to a reactor that is provided with an agitator, and the temperature of the reactor was maintained at 25° C. Separately, 45.4 g of aromatic dicarboxylic acid chloride mixture B in which the same amounts of isophthalic acid chloride and terephthalic acid chloride were mixed with each other was dissolved in 620 g of methylene chloride. The mixture solution B was added to the reactor in which the alkali aqueous solution A was dissolved while the solution was stirred. After the stirring was performed for 1 hour, a hydrochloric acid was added, and the washing was then performed with distilled water. The washing was repeated until the conductivity of the water layer was 20 μs/cm or less, the resulting solution was poured onto methanol to perform phase separation of polymers. The polymers were filtered, and the drying was performed in a vacuum oven at 60° C. for 12 hours to remove the solvent. (Mw 58 k, Mn 27 k, Tg 178° C.)

20 g of the dried solid was dissolved in 800 g of MC, and then 7.0 g of mCPBA (purity 70%) was added thereto. The mixture was left at room temperature for 24 hrs for epoxidation, and then precipitated with an excessive amount of ethanol. (Mw 60 k, Mn 28 k, Tg 183° C.)

Comparative Example 1 and Examples 1 to 3

Manufacture of Cured Product

As listed in the following Table 1, BA230S® (oligomer of 2,2-bis(4-cyanatephenyl)propane, Lonza) were added to the solutions, in which 100 pt of the polyarylate having epoxy group of Preparation Example 1 was dissolved in dichloroethane at a concentration of 15 wt %, and dissolved at room temperature to prepare a homogeneous solution. The obtained solution was poured into a Tefron mold, and then the temperature was increased at a heating rate of 5° C./min, and curing was performed at 300° C. for 5 min. The obtained sample was heated to 300° C. at a heating rate of 10° C./min in DSC, and Tg was analyzed. The results are shown in the following Table 1.

TABLE 1

|  | BA230S ® (pt) | Tg(° C.) |
| --- | --- | --- |
| Comparative Example 1 | 0 | 173 |
| Example 1 | 50 | 190 |
| Example 2 | 100 | 191 |
| Example 3 | 200 | not measurable |

Comparative Example 2 and Examples 4 to 6

Manufacture of Cured Product

As listed in the following Table 2, BA230S®(oligomer of 2,2-bis(4-cyanatephenyl)propane, Lonza) were added to the solutions, in which 100 pt of the polyarylate having epoxy group of Preparation Example 2 was dissolved in dichloroethane at a concentration of 15 wt %, and dissolved at room temperature to prepare a homogeneous solution. The obtained solution was poured into a Tefron mold, and then the temperature was increased at a heating rate of 5° C./min, and curing was performed at 250° C. for 60 min. The obtained sample was heated to 300° C. at a heating rate of 10° C./min in DSC, and Tg was analyzed. The results are shown in the following Table 2.

TABLE 2

|  | BA230S ® (pt) | Tg(° C.) |
| --- | --- | --- |
| Comparative Example 2 | 0 | 133 |
| Example 4 | 50 | 160 |
| Example 5 | 100 | 161 |
| Example 6 | 200 | not measurable |

Examples 7 to 9

Manufacture of Cured Product

As listed in the following Table 3, BA230S®(oligomer of 2,2-bis(4-cyanatephenyl)propane, Lonza) were added to the solutions, in which 100 pt of the polyarylate having epoxy group of Preparation Example 3 was dissolved in dichloroethane at a concentration of 15 wt %, and dissolved at room temperature to prepare a homogeneous solution. The obtained solution was poured into a Tefron mold, and then the temperature was increased at a heating rate of 5° C./min, and curing was performed at 250° C. for 60 min. The obtained sample was heated to 300° C. at a heating rate of 10° C./min in DSC, and Tg was analyzed. The results are shown in the following Table 3.

TABLE 3

|  | BA230S ® (pt) | Tg(° C.) |
| --- | --- | --- |
| Example 7 | 50 | 190 |
| Example 8 | 100 | 194 |
| Example 9 | 200 | not measurable |

The invention claimed is:

1. A curing composition comprising a polyarylate having epoxy group and a cyanate ester resin,
wherein the polyarylate having epoxy group has a repeating unit that is represented by the following Formula 2,
wherein the polyarylate having epoxy group has a weight average molecular weight of 32,000 to 100,000,
wherein the cyanate ester resin is contained in an amount of 50 to 200 parts by weight, based on 100 parts by weight of the polyarylate having epoxy group,
wherein a cyanurate structure is formed by curing the cyanate ester group of the cyanate ester resin, and an isocyanurate structure is formed by reacting the cyanurate structure with the epoxy group in the polyarylate, and
wherein the polyarylate is incorporated into the network structure of the cyanate ester resin, leading to graft formation:

[Formula 2]

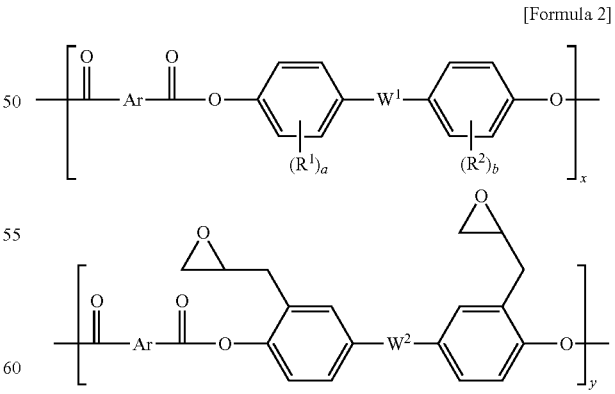

wherein
x and y are a molar ratio satisfying x+y=1, x≥0, and y>0, a and b are an integer of 1 to 4,
$R^1$ and $R^2$ are the same as or different from each other, each independently selected from the group consisting of hydrogen atom, halogen atom, alkyl, arylalkyl, alkenyl, arylalkenyl, aryl, alkylaryl, alkenylaryl, nitrile and alkoxy, $W^1$ and $W^2$ are each independently selected from the group consisting of direct bond, oxygen, sulfur, alkylene, cycloalkylene, fluorene, sulfonyl, sulfinyl, and carbonyl, and Ar is selected from the group consisting of phenylene, naphthylene and biphenylene.

2. The curing composition according to claim 1, wherein y in Formula 2 is 0.1 to 1.

3. The curing composition according to claim 1, wherein the cyanate ester resin includes a compound that is represented by the following Formula 3 or oligomer thereof:

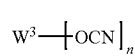

[Formula 3]

wherein n is an integer of 2 or more, and $W^3$ is selected from the group consisting of alkyl, alkylaryl, alkyldiaryl, cycloalkyl, cycloalkyldiaryl, aryl, fluorene, fluorenediaryl, oxydiaryl, sulfonyldiaryl, sulfinyldiaryl, and carbonyldiaryl.

4. The curing composition according to claim 3, wherein $W^3$ is selected from the group consisting of alkyl, phenyl, alkyldiphenyl, cycloalkyldiphenyl, fluorenediphenyl, oxydiphenyl, biphenyl, sulfonyldiphenyl, sulfinyldiphenyl and carbonyldiphenyl.

5. The curing composition according to claim 1, wherein the cyanate ester resin includes one or more selected from the group consisting of 2,2-bis(4-cyanatophenyl)propane, bis(4-cyanatophenyl)methane, bis(3-methyl-4-cyanatophenyl) methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, di(4-cyanatophenyl)ether, di(4-cyanatophenyl)thioether, di(4-cyanato-2-tertiarybutyl-3-methylphenyl)thioether, 4,4-dicyanatobiphenyl, 1,3-bis(4-cyanatophenyl-1-(1-methylethylidene))benzene, 1,4-bis(4-cyanatophenyl-1-(1-methylethylidene))benzene, and 4,4"-bis(trifluoromethyl) methylenediphenyl cyanate.

6. The curing composition according to claim 1, wherein the curing composition further includes a curing catalyst or a curing agent.

7. The curing composition according to claim 6, wherein the curing agent includes one or more selected from the group consisting of imidazole, transition metal catalyst, phenol, and phenol having substituents.

8. The curing composition according to claim 7, wherein the transition metal catalyst is an organic material including one or more selected from the group consisting of divalent cobalt ion, divalent zinc ion, divalent manganese ion, and trivalent manganese ion.

9. The curing composition according to claim 8, wherein the transition metal catalyst includes one or more selected from the group consisting of acetic acid cobalt, acetylacetic acid cobalt, 2-ethylhexanoic acid cobalt, hexafluoro acetylacetic acid cobalt, oxalic acid cobalt, naphthalic acid cobalt, acetic acid zinc, citric acid zinc, 4-cyclohexylbutanoic acid zinc, naphthalic acid zinc, acetylacetic acid manganese(II), acetylacetic acid manganese(III), and naphthalic acid manganese.

10. The curing composition according to claim 7, wherein the phenol or phenol having substituents is those substituted with a hydroxy, alkyl, aryl, substituted aryl group, halogen or hydrogen in a benzene ring.

11. The curing composition according to claim 10, wherein the phenol or phenol having substituents includes one or more selected from the group consisting of tetramethylphenol, 2,4,6-tribromo-3-methoxyphenol, 2,6-dibromo-4-t-butylphenol, 2-methylphenol, 3-methylphenol, 4-methylphenol, 2-ethylphenol, 3-ethylphenol, 4-ethylphenol, 2-propylphenol, 3-propylphenol, 4-propylphenol, 2-isopropylphenol, 3-isopropylphenol, 4-isopropylphenol, 2-t-butylphenol, 3-t-butylphenol, 4-t-butylphenol, 2-isobutylphenol, 3-isobutylphenol, and 4-isobutylphenol.

12. The curing composition according to claim 6, wherein the curing agent is contained in an amount of 0.01 to 10 parts by weight, based on 100 parts by weight of the curing composition.

13. The curing composition according to claim 1, wherein the curing composition further includes one or more selected from the group consisting of a filler, a plasticizer, a release agent, a coloring agent, a coupling agent and a solvent.

14. A curing method comprising the step of curing the curing composition according to claim 1 by using at least one selected from the group consisting of heat, light and microwave alone or in sequential or simultaneous combinations.

15. A cured product manufactured by using the curing composition according to claim 1.

16. A composite manufactured by mixing the curing composition according to claim 1 with glass fiber or carbon fiber.

* * * * *